Aug. 18, 1953     J. S. YARROW     2,649,551
OSCILLATORY MOTOR
Filed Feb. 14, 1950
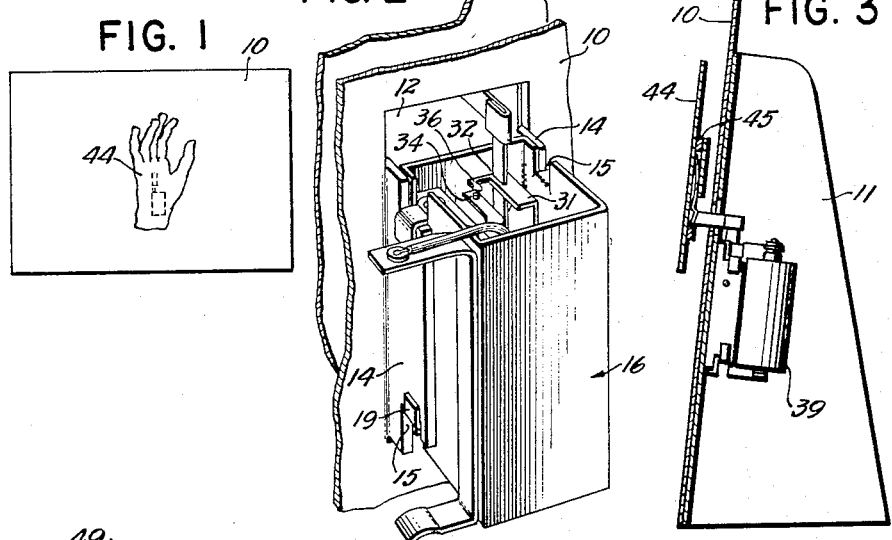
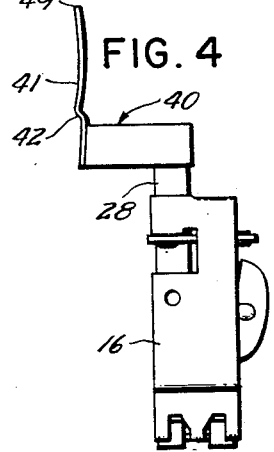
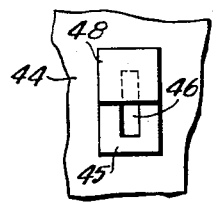
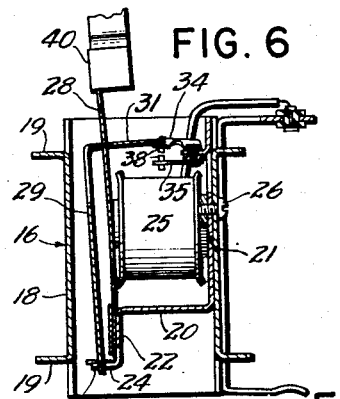
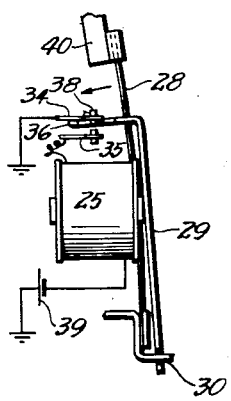
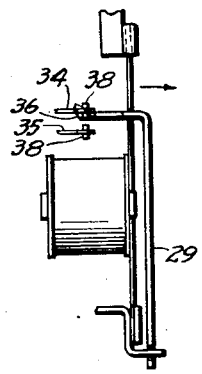
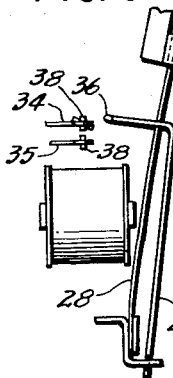
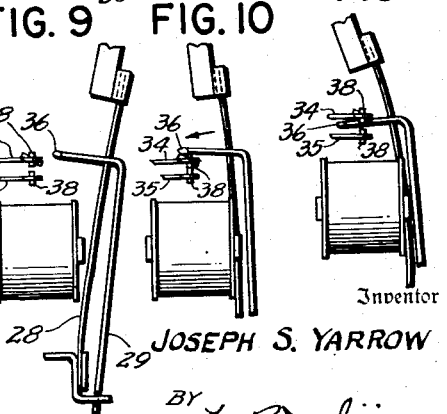
Inventor
JOSEPH S. YARROW
BY F. R. Jenkins
Attorney Patented Aug. 18, 1953

2,649,551

UNITED STATES PATENT OFFICE 2,649,551

OSCILLATORY MOTOR

Joseph S. Yarrow, Litchfield County, Conn.

Application February 14, 1950, Serial No. 144,155

3 Claims. (Cl. 310—32)

This invention relates to oscillatory electric motors and more particularly to motors for animated displays although such motors may be used for any purpose requiring small quantities of power such as in toys, timers, instruments and other devices too numerous to mention.

One object of this invention is to provide such a motor wherein the period of time in which current is drawn is a very small part of the period of oscillation, so that when a dry cell is used as a current source there will be a substantial recuperative period for the cell between the deliveries of current.

Another object is to provide such a motor wherein the magnetic attraction of an armature occurs when the armature is at least as late as at the midpoint in its oscillation toward the magnet. In other words the magnetic attraction occurs when the armature is already being carried toward the magnet by inertia and the attraction acts counter to other restorative forces, such as springs or gravity.

Yet another object is to provide, in connection with the aforementioned provisions, an arrangement in such a motor so that the member will have three quarters of a period of oscillation free from any magnetic force.

The attainment of these objects is shown in connection with a display and motor which comprises a member mounted for oscillatory motion and an electro-magnet for supplying increments of energy to maintain the motion. The energy increments are supplied by an intermittent force so timed as to act counter to the normal restorative forces on the member, rather than to supplement such forces.

In the accompanying drawing showing, by way of example, one of many possible embodiments of the invention, Fig. 1 is a front view of the display as a whole;

Fig. 2 is a rear perspective showing the motor of the display as mounted thereon;

Fig. 3 is a side elevation, partly in section, showing the display as a whole;

Fig. 4 is a side elevation of the motor;

Fig. 5 is a fragmental rear view of the movable panel;

Fig. 6 is a vertical sectional view showing the motor; and

Figs. 7–11 are operational diagrams showing positions in phases of the operation of the motor.

The device comprises a stationary panel 10 and a prop 11 therefor, the former having a cutout 12 whereby backwardly turned flaps 14 are formed, the flaps being provided with upper and lower notches 15. A motor 16 having a square tubular housing 18 is mounted to the rear of said panel and is secured to said flaps by tongues 19 on the housing bent in the notches over the flaps. The motor comprises a strip having three right angle bends forming a step-like member 20 having an end portion 21 disposed against the inner face of one wall of the housing and providing an offset vertical portion 22 and bracket portion 24 thereunder. A horizontal electromagnet 25 is disposed above the offset vertical portion and terminates a little short thereof and is held in place by a bolt 26 passing through the housing and securing the magnet and strip thereto.

A vibrator strip spring 28 is secured at its lower end to the portion 22 and rises above the housing for connection to whatever member is to be oscillated. One such member is described hereinafter. An L-shaped armature plate 29 is hinged to the bracket 24 as at 30 and has an arm 31 provided with a slot 32 in which the spring 28 is loosely engaged. The hinged lower part of the armature, the spring 28, and the inner end of the magnet 25 are so situated that when the armature is attracted by the magnet the armature bends the strip spring from the vertical and toward the magnet; then when the magnet is de-energized the elasticity and inertia of the spring (and anything secured to its free upper end) cause a reverse swing.

Upper and lower contact leaves 34 and 35, insulated from each other, are mounted on the housing above the magnet, the upper leaf being movable and resilient. The resulting switch is operated by a hook-like projection, or actuator, 36 extending from the arm 31 and adapted to pass laterally over the end of the upper leaf 34 and close the contacts 38 when the hook 36 passes in one direction and to pass under the upper leaf when the hook passes in the opposite direction. The details of operation are given below and are explained in connection with the operation of the device as a whole. The lower leaf is insulated from the housing and connected to one end of the magnet coil while the upper leaf is grounded to the housing and a source of current such as cell 39 is connected to the ground and the other end of the magnet coil; thus forming a simple well-known circuit wherein the switch is interposed between the current source and magnet.

A mounting piece passes through the cut-out 12 and is secured to the upper end of the spring 28 and provided with an offset curved blade 41 projecting upwardly, said blade being nearly parallel to the plane of and forward of the fixed panel 10 and provided with an offset as at 42.

The animated portion of the display may take many forms, for example, a movable cardboard panel 44 forward of the fixed panel. For securing the panel 44 to the mounting member a sheet 45 of cardboard having a rectangular hole 46 therein is secured to the rear face of the movable panel and a cover piece 48 secured to the sheet 45 over the upper portion of the hole. The blade 41 of said mounting piece is received in said hole, the offset 42 and the upper end 49 being in against the face of panel 44.

In operation, as more easily understood by reference to Figs. 7–11, with the hook 36 having passed laterally over the upper end leaf 34 and the leaf in a leftward direction, the device attains relative positions as shown in Fig. 7, wherein the spring 28 becomes distorted from its normal vertical position. The elasticity of the spring then carries the armature and hook rightwardly, the hook passing under the upper leaf (Fig. 8). Then the inertia of the moving parts, particularly the moving panel 44, carries the hook to extreme right position as shown in Fig. 9. The normal return motion of the spring carries the hook or actuator over the upper leaf but this time (with leftward motion) the hook forces the upper leaf down to close the contacts 38.

The non-closure of the contacts by rightward motion of the hook, but closure of contacts by leftward motion, is accomplished by a kind of camming action of the hook 36 against the upper leaf 34 which is wide in comparison with its thickness. The center of the arc of oscillation of the hook is situated so that the left edge of the upper leaf is normally outside the arc while the right edge is within the arc. This is shown exaggerated in Figs. 7–11 as a twisted leaf though this twist is not necessary since there is horizontal distance between the leaf and the spring mount.

The action of the energized magnet furnishes a slight impulse to maintain the oscillations of the system. After the impulse, the hook clears the upper leaf, allowing the contacts to spring open and the system assumes a position as in Fig. 11 to complete the above described cycle.

It will be noticed that the device is so timed that the impulse to maintain oscillation occurs during or just after the phase when the oscillatory parts are moving their fastest and only when the armature is approaching the magnet. This enables the impulse to operate when the armature nears the magnet (and the attraction of the latter is stronger) and also prevents the contact points from remaining closed for longer periods than are necessary. It has been calculated that the contacts remain closed for only about a twelfth of the cycle period and so there is obtained a long recuperative time for the cell 39 between the periods when current is drawn.

The motor substantially as shown has been sold by the tens of thousands and it has been found that a commercial size D flash-light cell will operate the motor carrying a half-ounce movable panel for a period of three weeks constantly. Furthermore the motor can be so cheaply made that when the display has lost its appeal it is not contemplated that the motors be salvaged.

Oscillatory motors for displays are well-known but all of which I am aware of deliver an impulse when the armature is most remote from the magnet. In other words, the impulse acts to supplement the restoring force of a spring or of gravity. In my motor the impulse acts counter to the restoring force and when the armature approaches the magnet so that, by the inverse square law, the magnet acts in the most effective manner.

Ideally the impulse should occur when the oscillating members 28 and 44 have almost reached a dead stop with the armature an infinitesimal distance from the magnet. By having the slot 32 wide enough to allow a little lost motion I can approach this condition without loss of speed for closing and reopening the contacts for the momentum of the armature would give the strip a slight blow.

I claim as my invention:

1. In an oscillatory motor, an armature mounted for oscillation about a substantially fixed axis and having a projection extending parallel to said axis constrained to move in a cylindrical arc about said axis; an electromagnet fixed with respect to said axis; and a contact spring leaf having one end fixed with respect to the magnet and axis and the other end portion free for resilient movement, the leaf projecting parallel to the axis into the path of said projection and, in normal position, having one longitudinal edge of the free end portion slightly outer of said arc and the other edge slightly inner of the arc, and a resilient element vibratory about an axis close to the first mentioned axis and loosely connected to said armature to transmit motion of the armature to the said element, and motion of the element to the armature.

2. A motor comprising a mounting strip having three right angle bends forming step-like member having an upper end portion providing an offset vertical portion and bracket portion thereunder; a horizontal electromagnet secured to the upper end portion above the offset vertical portion; a vibrator strip spring secured at its lower end to the bracket portion, and mounted for vibratory movement generally in a direction toward and from the electromagnet; an L-shaped armature plate hinged at the lower end of the plate to the bracket to move toward and from the armature and oscillatory about the axis of the hinge the plate providing a horizontal arm at the upper end portion and having a slot in which the spring is loosely engaged; substantially horizontal upper and lower normally open contact leaves insulated from each other and mounted on the housing above the magnet, the upper leaf being movable and resilient; and a projection extending from the arm parallel to said axis and movable in a cylindrical arc about said axis, said arc being inner of one edge of the upper leaf and outer of the other edge, the projection being adapted to pass laterally over the end of the upper leaf in one direction and close the contact and to pass under the upper leaf when the hook passes in the opposite direction.

3. A motor comprising a housing; a strip within the housing and having three right angle bends forming step-like member having an upper end portion disposed against the inner face of one wall of the housing and providing an offset vertical portion and bracket portion thereunder; a horizontal electromagnet secured to the housing above the offset vertical portion and terminating a little short thereof; a vibrator strip spring secured at its lower end to the bracket portion and rising above the housing; an inertia body on the upper end of the spring; an L-shaped armature plate hinged at the lower end of the plate to the bracket and oscillatory about the axis of the hinge and having a horizontal arm provided with a slot in which the spring is loosely engaged; substantially horizontal upper and lower normally open contact leaves insulated from each other and mounted on the housing above the magnet, the upper leaf being movable and resilient; a projection, extending from the arm parallel to said axis and movable in a cylindrical arc about said axis, said arc being inner of one edge of the upper leaf and outer of the other edge, the projection being adapted to pass laterally over the end of the upper leaf in one direction and close the contact and to pass under the upper leaf when the hook passes in the opposite direction; the lower leaf being insulated from the housing and connected to one end of the magnet coil, the upper leaf grounded to the housing; and a source of current connected to the ground and the other end of the magnet coil.

JOSEPH S. YARROW.

References Cited in the file of this patent

UNITED STATES PATENTS

| Number | Name | Date |
| --- | --- | --- |
| 1,038,438 | Rettman | Sept. 10, 1912 |
| 1,321,635 | Hoeschen | Nov. 11, 1919 |
| 1,485,098 | Varley | Feb. 26, 1924 |
| 1,846,101 | Grothe | Feb. 23, 1932 |
| 2,073,321 | Smith | Mar. 9, 1937 |
| 2,116,638 | Prins | May 10, 1938 |
| 2,251,116 | Cristofoli | July 29, 1941 |
| 2,439,248 | Gregory | Apr. 6, 1948 |
| 2,529,720 | Yarrow | Nov. 14, 1950 |
| 2,544,105 | Quick | Mar. 6, 1951 |

FOREIGN PATENTS

| Number | Country | Date |
| --- | --- | --- |
| 35,885 | Austria | Jan. 25, 1909 |